US 9,381,911 B2

United States Patent
Aldrich, III et al.

(10) Patent No.: US 9,381,911 B2
(45) Date of Patent: Jul. 5, 2016

(54) HYBRID VEHICLE AND METHOD OF CONTROLLING SAME FOR ENGINE AUTO-STOP AT NON-ZERO VEHICLE SPEED

(71) Applicant: GM GLOBAL TECHNOLOGY OPERATIONS LLC, Detroit, MI (US)

(72) Inventors: William L. Aldrich, III, Davisburg, MI (US); Paul S. Lombardo, Commerce Township, MI (US); Jeffrey R. Aldrich, Davison Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 16 days.

(21) Appl. No.: 14/464,066

(22) Filed: Aug. 20, 2014

(65) Prior Publication Data
US 2016/0052510 A1  Feb. 25, 2016

(51) Int. Cl.
| | |
|---|---|
| B60L 9/00 | (2006.01) |
| B60L 11/00 | (2006.01) |
| G05D 1/00 | (2006.01) |
| G05D 3/00 | (2006.01) |
| G06F 7/00 | (2006.01) |
| G06F 17/00 | (2006.01) |
| B60W 20/00 | (2016.01) |
| B60K 6/485 | (2007.10) |
| B60W 10/06 | (2006.01) |
| B60W 10/08 | (2006.01) |
| B60W 30/18 | (2012.01) |
| F02N 11/08 | (2006.01) |

(52) U.S. Cl.
CPC ............... *B60W 20/40* (2013.01); *B60K 6/485* (2013.01); *B60W 10/06* (2013.01); *B60W 10/08* (2013.01); *B60W 30/18063* (2013.01); *B60W 30/18109* (2013.01); *F02N 11/0811* (2013.01); *F02N 11/0822* (2013.01); *B60W 2510/0657* (2013.01); *B60W 2510/08* (2013.01); *B60W 2510/1005* (2013.01); *B60W 2510/18* (2013.01); *B60W 2520/105* (2013.01); *Y10S 903/93* (2013.01)

(58) Field of Classification Search
USPC ........................... 701/22, 57, 106, 70, 56, 51; 180/65.275, 65.265, 65.2, 65.21, 65.1, 180/65.22; 903/941, 945, 947, 902, 930, 903/951; 477/5, 9; 123/350
See application file for complete search history.

(56) References Cited

U.S. PATENT DOCUMENTS

| | | | |
|---|---|---|---|
| 7,703,563 B2 | 4/2010 | Aldrich, III et al. | |
| 8,112,207 B2 * | 2/2012 | Heap ...................... | B60K 6/387 477/181 |
| 8,942,899 B1 * | 1/2015 | Spohn ................... | B60W 10/06 701/54 |
| 9,026,296 B1 * | 5/2015 | Johri ..................... | B60W 20/10 701/22 |
| 2002/0179047 A1 * | 12/2002 | Hoang ................... | B60K 6/485 123/350 |
| 2006/0022469 A1 * | 2/2006 | Syed ....................... | B60K 6/44 290/40 C |

(Continued)

*Primary Examiner* — Ronnie Mancho
(74) *Attorney, Agent, or Firm* — Quinn Law Group, PLLC

(57) ABSTRACT

A method of controlling a vehicle with a hybrid powertrain with an engine and a motor/generator includes monitoring net axle torque on the drive axle, monitoring vehicle deceleration rate, monitoring vehicle speed, and controlling the motor/generator to stop rotation of the engine crankshaft when the vehicle speed is non-zero and below a predetermined vehicle speed auto-stop enable threshold if torque percentage braking torque is greater than a predetermined percentage braking torque and the vehicle deceleration rate is greater than a predetermined threshold vehicle deceleration rate. A hybrid vehicle has a controller with a processor that executes a stored algorithm to carry out the method.

20 Claims, 7 Drawing Sheets

(56) References Cited

U.S. PATENT DOCUMENTS

| | | | | |
|---|---|---|---|---|
| 2008/0051950 | A1* | 2/2008 | Seo | B60K 6/46 701/22 |
| 2008/0215201 | A1* | 9/2008 | Okubo | B60K 6/365 701/22 |
| 2008/0220934 | A1* | 9/2008 | Babcock | B60W 10/06 477/5 |
| 2009/0012665 | A1* | 1/2009 | Brennan | B60L 1/003 701/22 |
| 2009/0037060 | A1* | 2/2009 | Carlhammar | B60K 6/387 701/54 |
| 2009/0043467 | A1* | 2/2009 | Filev | B60K 6/32 701/57 |
| 2009/0204280 | A1* | 8/2009 | Simon, Jr. | B60W 20/00 701/22 |
| 2010/0063704 | A1* | 3/2010 | Okubo | B60K 6/365 701/99 |
| 2010/0087996 | A1* | 4/2010 | Haggerty | B60K 6/445 701/58 |
| 2011/0053735 | A1* | 3/2011 | Lewis | F02N 11/0822 477/99 |
| 2011/0065548 | A1* | 3/2011 | Yu | B60W 10/06 477/203 |
| 2011/0098152 | A1* | 4/2011 | Sah | B60K 6/365 477/86 |
| 2011/0106351 | A1* | 5/2011 | Sah | B60K 6/365 701/22 |
| 2011/0178662 | A1* | 7/2011 | Sime | B60K 6/445 701/22 |
| 2011/0238244 | A1* | 9/2011 | Sah | B60K 6/445 701/22 |
| 2012/0323401 | A1* | 12/2012 | McGrogan | B60W 20/108 701/1 |
| 2013/0045835 | A1* | 2/2013 | Schang | B60W 10/06 477/78 |
| 2014/0171260 | A1* | 6/2014 | Dalum | B60W 20/10 477/5 |
| 2015/0032309 | A1* | 1/2015 | Liang | B60W 20/40 701/22 |
| 2015/0051048 | A1* | 2/2015 | Heap | B60W 20/1084 477/115 |
| 2015/0112525 | A1* | 4/2015 | Johri | B60W 10/06 701/22 |
| 2015/0167614 | A1* | 6/2015 | Malone | F02N 11/0822 701/54 |
| 2015/0197242 | A1* | 7/2015 | Yamazaki | B60W 20/30 701/22 |
| 2015/0202964 | A1* | 7/2015 | Nefcy | B60L 7/18 701/70 |
| 2015/0203106 | A1* | 7/2015 | Zhao | B60L 7/18 701/22 |
| 2015/0251657 | A1* | 9/2015 | Johri | B60L 7/10 701/22 |

* cited by examiner

HYBRID VEHICLE AND METHOD OF CONTROLLING SAME FOR ENGINE AUTO-STOP AT NON-ZERO VEHICLE SPEED

TECHNICAL FIELD

The present teachings generally include a hybrid vehicle and a method of controlling a hybrid vehicle for an engine auto-stop.

BACKGROUND

Hybrid electric vehicles utilizing both an electric motor/generator and an internal combustion engine as power sources often have an onboard electronic controller programmed to vary the use of the engine and motor/generator during different driving conditions to achieve peak efficiency. One type of hybrid electric vehicle is referred to as a belt-alternator-starter (BAS) hybrid vehicle. This type of vehicle may have a motor/generator operatively connected to an engine crankshaft by a belt and pulley system. The motor/generator in a BAS hybrid vehicle may be used to start the engine from a key start and may be recharged by the engine during regenerative braking BAS hybrids are sometimes controlled to provide an engine auto-stop when vehicle speed is zero but the key is in the run position, such as when the vehicle is stopped at a stop light. An engine "auto-stop" is a controlled stop of the engine that brings the rotational speed of the crankshaft to zero when the key is still in the run position. The engine is then started by the motor/generator when propulsion is desired, as may be indicated by a lifting of a brake pedal. This type of start is referred to as an "auto-start".

Engine creep torque is the relatively low drive torque transmitted to the drive axle due to rotational speed of the engine when the accelerator pedal is not depressed and the engine rotation is mechanically coupled to the drive wheels via some torque transmission device such as a hydraulic torque converter commonly utilized in automatic transmission equipped vehicles. Engine creep torque will cause a vehicle to creep forward at a very low speed if neither the accelerator pedal nor the brake pedal is depressed. When vehicle speeds are relatively low and neither the brake nor accelerator pedals are applied, engine creep torque is the predominant motive vehicle force and changes in engine creep torque are noticeable to a vehicle operator.

SUMMARY

A method of controlling a hybrid powertrain enables engine auto-stop at non-zero vehicle speeds while minimizing the possibility of the associated loss of creep torque being a noticeable disturbance to the vehicle operator. More specifically, the method of controlling a vehicle with a hybrid powertrain is carried out by an electronic controller and includes monitoring net axle torque on the drive axle. The net axle torque is the sum of engine torque in a first rotational direction, considered herein as positive torque, and braking torque in a second direction opposite the first direction, considered herein as negative torque. Positive torque is provided in a rotational direction of the axle that propels the vehicle in the selected direction of travel (forward or reverse). Negative torque is torque provided in a rotational direction of the axle that opposes the selected direction of travel. The engine creep torque accounts for some or all of the engine torque contribution to the net axle torque, depending on factors such as the position of an operator-controlled propulsion input device, such as an accelerator pedal, vehicle speed and deceleration.

In addition to net axle torque, the electronic controller also monitors vehicle deceleration rate, vehicle speed, and other operating conditions.

The motor/generator may be controlled to stop rotation of the crankshaft when the vehicle speed is non-zero and below an auto-stop vehicle speed threshold if a percentage braking torque (i.e., the ratio of braking torque to the sum of engine torque and braking torque) is greater than a predetermined percentage braking torque, and the vehicle deceleration rate is greater than a predetermined threshold vehicle deceleration rate. The method may require that the percentage braking torque and vehicle deceleration rate requirements are met prior to the vehicle speed dropping below a vehicle speed auto-stop enable threshold. A minimum time period may be imposed for which these and other requirements must remain satisfied before a non-zero vehicle speed engine auto-stop is commanded by the controller.

The circumstances in which non-zero vehicle speed engine auto-stops are commanded are thus limited to those in which the engine creep torque is not a significant portion of the axle torque, and the loss of engine creep torque with the controlled stop of the engine is masked by other operating conditions such as deceleration and braking torque. By setting the percentage braking torque and the threshold vehicle deceleration rate relatively high, the noticeability of the loss of engine creep torque is minimal. Additional prerequisites to a non-zero vehicle speed auto-stop under the method may include satisfying predetermined motor/generator capability requirements, a predetermined auto-stop vehicle speed threshold, a predetermined brake pedal position requirement, and being in a predetermined transmission gear ratio. The auto-stop vehicle speed threshold may increase with increasing vehicle deceleration rate, so that engine auto-stop is permitted at higher vehicle speeds when under greater deceleration rate. The predetermined brake pedal position requirement may be a function of vehicle grade.

Fuel economy may thus be improved by implementing engine auto-stops at non-zero vehicle speeds, in addition to typical auto-stops at zero-vehicle speed, without impacting perceived drivability. Moreover, the likelihood of a vehicle operator's change-of-mind with respect to slowing the vehicle to a stop is minimized, and thus aborted auto-stops are avoided.

The above features and advantages and other features and advantages of the present teachings are readily apparent from the following detailed description of the best modes for carrying out the present teachings when taken in connection with the accompanying drawings.

DETAILED DESCRIPTION

Figure 1:
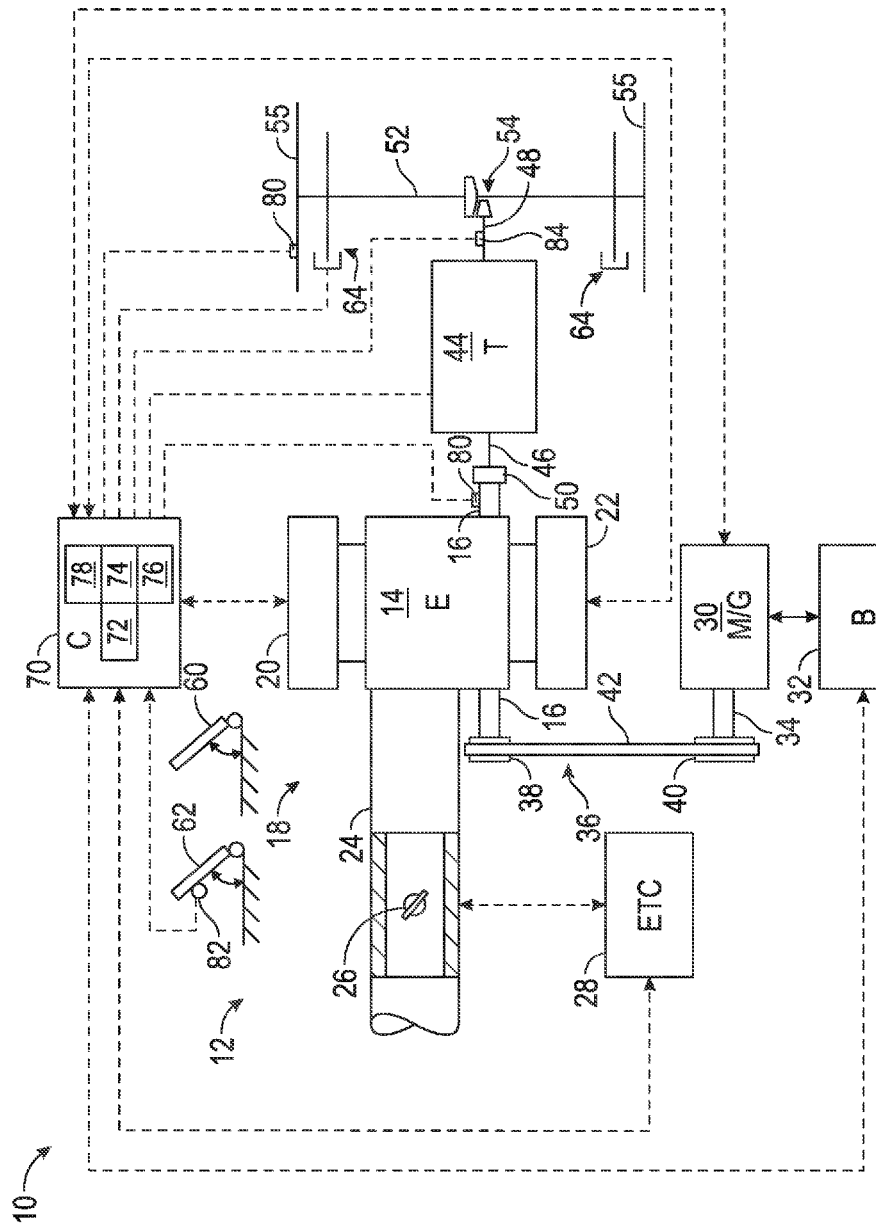
FIG. 1 is a schematic illustration of a vehicle in accordance with the present teachings.

Referring to the drawings, wherein like reference numbers refer to like components, FIG. 1 shows a hybrid vehicle 10 that has a hybrid powertrain 12. The hybrid powertrain 12 includes an engine (E) 14 with a rotatable crankshaft 16. The engine 14 may be an internal combustion engine in communication with an air intake system 18, a fuel system 20, and an ignition system 22. The intake system 18 may include an intake manifold 24, a throttle 26, and an electronic throttle control (ETC) 28. The ETC 28 may control the position of the throttle 26 to regulate air flow into cylinders in the engine 14. The fuel system 20 may include fuel injectors (not shown) to control a fuel flow into the engine 14, and the ignition system 22 may ignite the air/fuel mixture provided to the engine 22 by the intake system 18 and the fuel system 20.

The hybrid powertrain 12 also includes an electric motor/generator (M/G) 30 that is controllable to function as a motor or as a generator, depending on vehicle operating conditions. The motor/generator 30 may be in electrical communication with a rechargeable battery module (B) 32. When controlled to function as a motor, electrical power from the battery module 32 is converted to mechanical power to rotate a motor shaft 34 of the motor/generator 30. When controlled to function as a generator, the motor/generator 30 converts mechanical power of the rotating motor shaft 34 (and the crankshaft 16 operatively connected thereto) into electrical power that recharges and is stored in the battery module 32.

The motor shaft 34 is operatively connected to the crankshaft 16 via a belt drive system 36. Such an arrangement is referred to as a belt-alternator-starter (BAS) system. The engine 14 and motor/generator 30 are coupled via the BAS system 36 that includes a first pulley 38, a second pulley 40, and a belt 42. The first pulley 38 may be coupled for rotation with the crankshaft 16 and the second pulley 40 may be coupled for rotation with the motor/generator 30. The first and second pulleys 38, 40 may be coupled for rotation with one another via the belt 42. Alternatively, the belt drive system 36 may include a chain in lieu of the belt 42 and sprockets in lieu of the pulleys 38, 40. Both embodiments of the belt drive system 36 are referred to herein as a "belt drive system". In some embodiments, a selective coupling device may be used to selectively couple and uncouple one of the pulleys 38, 40 with the crankshaft 16 or the motor shaft 34, making the operative connection of the motor/generator 30 and the crankshaft 16 selectable.

When the motor/generator 30 functions as a motor, it may start the engine 14 by rotating the crankshaft 16, and may assist the engine 14 in providing torque for propulsion of the vehicle 10. When the motor/generator 30 functions as a generator, it may convert rotational energy of the crankshaft 16 into electrical energy stored in the battery module 32.

The hybrid powertrain 12 also includes a transmission (T) 44 that includes a rotatable input member 46, a rotatable output member 48, and a plurality of clutches and intermeshing gears (not shown) that can establish multiple different gear ratios, (wherein a gear ratio is the ratio of the torque of the output member 48 to the torque of the input member 46). The transmission 44 may be any suitable type of transmission such as, but not limited to, a countershaft transmission, a transmission that has planetary gear sets, or a continuously variable transmission, as will be well understood by those skilled in the art.

The engine crankshaft 16 may be coupled to the transmission 44 via a coupling device 50 such as a friction clutch or a torque converter. The engine 14 and/or the motor/generator 30 can provide driving torque to the input member 46 to drive the output member 48 and power rotation of a drive axle 52 through a differential 54 to propel the vehicle 10 by turning wheels 55 mounted for rotation with the drive axle 52. Alternatively, when the motor/generator 30 functions as a generator, rotation of the crankshaft 16 is slowed by the motor/generator 30, as mechanical energy is converted into electrical energy that recharges the battery module 32.

An operator-controlled propulsion input device such as an accelerator pedal 60 (also referred to as a gas pedal) is depressible over a range of movement to indicate a desired acceleration and speed of the vehicle 10. An operator-controlled braking device such as a brake pedal 62 is depressible over a range of movement to indicate a desired braking torque on the drive axle 52. The brake pedal is operatively connected to a mechanical braking system 64 that engages the wheels to slow the drive axle 52. For example, the brake pedal position (i.e., amount of depression of the brake pedal 62) may control and correspond with hydraulic pressure applied to the mechanical braking system 64.

An electronic controller (C) 70 is operable to control the hybrid powertrain 12 to establish various operating modes.

The electronic controller 70 includes at least one processor 72 that executes one or more stored algorithms 74 based on various vehicle and powertrain inputs, and generates control signals in accordance with the stored algorithms that establish multiple operating modes. The electronic controller 70 may be configured as a single or distributed control device that is electrically connected to or otherwise placed in hard-wired or wireless communication with each of the engine 14, the ETC 28, the fuel system 20, the ignition system 22, the transmission 44, the coupling device 50, the braking system 64, the motor/generator 30 and any motor controller power inverter module integrated in the motor/generator 30, the battery module 32, and to the various sensors 80, 82, 84 discussed herein. The electronic controller 70 may be operatively connected to these components by transfer conductors, such as hard-wired or wireless control link(s) or path(s) suitable for transmitting and receiving the necessary electrical control signals and sensor signals for proper power flow control and coordination aboard the vehicle 10.

The electronic controller 70 includes one or more control modules, with one or more processors 72 and tangible, non-transitory memory 76, e.g., read only memory (ROM), whether optical, magnetic, flash, or otherwise. The electronic controller 70 may also include sufficient amounts of random access memory (RAM), electrically-erasable programmable read only memory (EEPROM), and the like, as well as a high-speed clock, analog-to-digital (A/D) and digital-to-analog (D/A) circuitry, and input/output circuitry and devices (I/O), as well as appropriate signal conditioning and buffer circuitry.

The electronic controller 70 can be a host machine or distributed system, e.g., a computer such as a digital computer or microcomputer, acting as a vehicle control module, and/or as a proportional-integral-derivative (PID) controller device having a processor, and, as the memory 76, tangible, non-transitory computer-readable memory such as read-only memory (ROM) or flash memory. Therefore, the controller 70 can include all software, hardware, memory 76, algorithms, connections, etc., necessary to monitor and control the hybrid powertrain 12. As such, one or more control methods executed by the controller 70 can be embodied as software or firmware associated with the controller 70. It is to be appreciated that the controller 70 can also include any device capable of analyzing data from various sensors, comparing data, and making decisions required to control the hybrid powertrain 12.

Figure 2A:
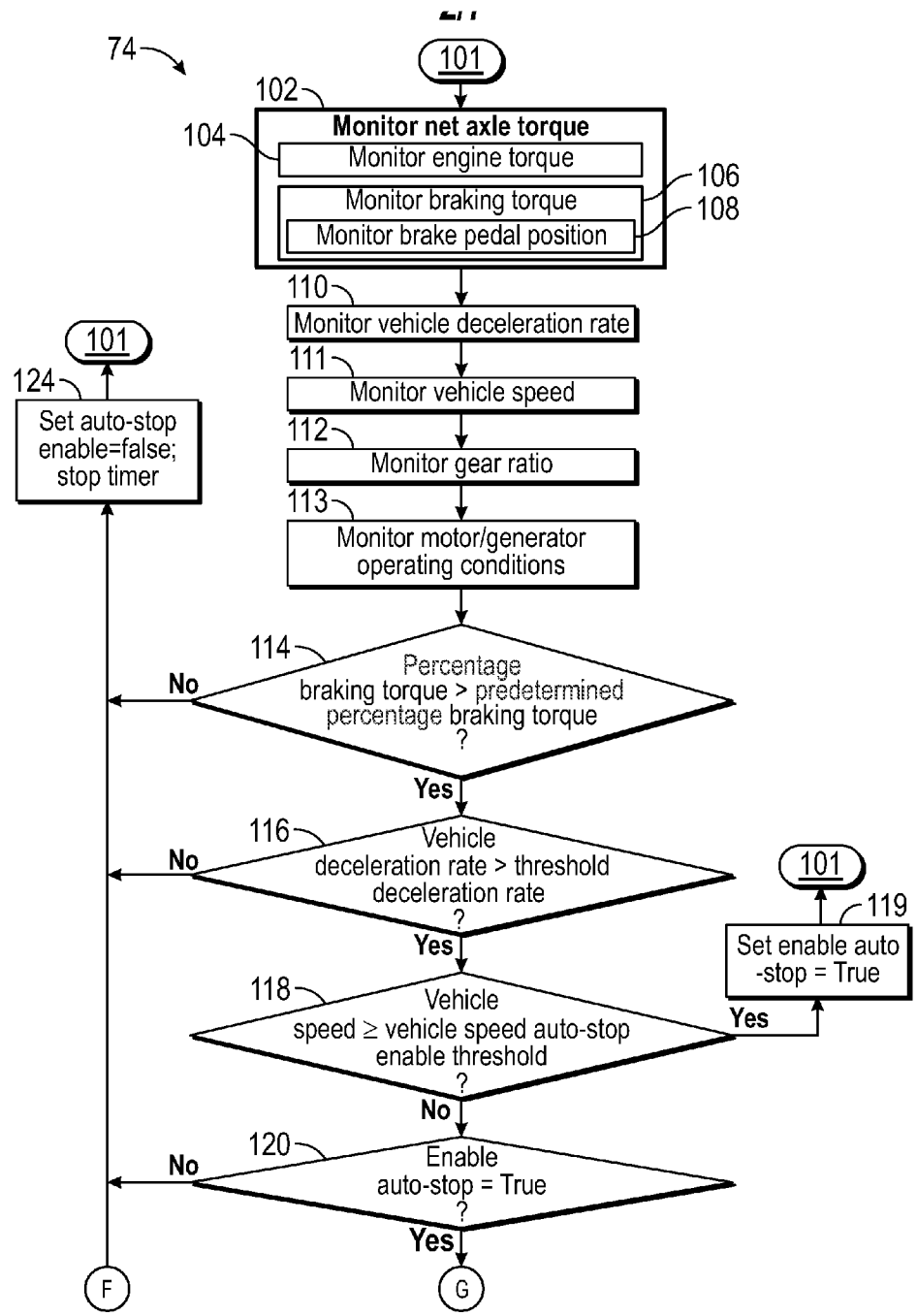
FIG. 2A is a first portion of a flow diagram of a method of controlling the vehicle of FIG. 1 in accordance with the present teachings.
Figure 2B:
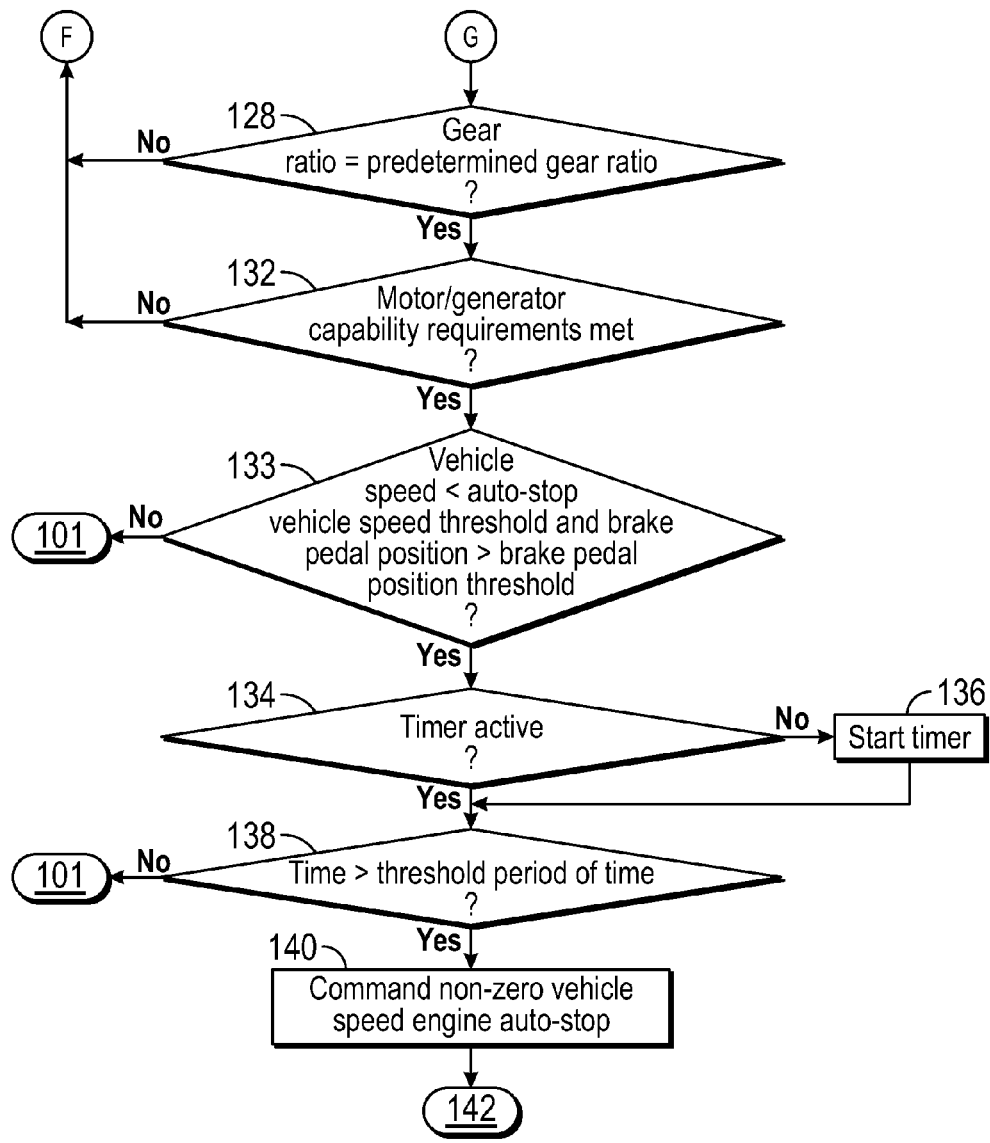
FIG. 2B is a second, remaining portion of the flow diagram of FIG. 2A.

The processor 72 executes the stored algorithm 74 to cause the motor/generator 30 to stop rotation of the crankshaft 16 while the vehicle speed is non-zero under certain vehicle operating conditions. The algorithm 74 is also referred to as a method of controlling the vehicle 10, and is illustrated in flow diagram form in FIG. 2A-2B. The portion of the flow diagram of FIG. 2A continues with the portion shown in FIG. 2B at points F and G. With reference to FIGS. 1 and 2A-2B, the algorithm 74 begins at start 101 when the vehicle 10 is moving. In block 102, the controller 70 monitors the torque on the drive axle 52, referred to as net axle torque. The axle torque can be determined by the controller 70 from sensor signals indicative of the axle torque. For example, torque sensors 80 can be placed on the wheel 55 to monitor net axle torque, and/or on the crankshaft 16 to monitor engine torque in sub-block 104. Alternately, the engine crankshaft 16 component of the axle torque can be calculated based on engine 14 commanded state, motor/generator 30 commanded state, crankshaft 16 speed, coupling device 50 characteristics and the currently implemented gear ratio of transmission 44. The component of net axle torque due to braking torque is also monitored, such as in sub-block 106 by monitoring the position of the brake pedal 62 with a position sensor 82 in sub-block 108. The position sensor 82 sends a sensor signal to the controller 70 that is indicative of brake pressure, and hence braking torque, as the brake pedal position can be indexed to hydraulic brake pressure applied to the braking system 64 to slow the wheels 55 and drive axle 52. The amount of depression of the brake pedal 62 to achieve a desired braking torque may be influenced by vehicle grade. Because grade also affects the rate of deceleration, grade may also be accounted for when considering brake pedal position as indicative of braking torque. The net axle torque can thus be monitored by monitoring positive engine torque and negative braking torque.

In addition to net axle torque, the controller 70 also monitors the deceleration rate of the vehicle 10 in block 110. The deceleration rate can be indicated by a sensor signal received from a speed sensor 84 positioned on the transmission output member 48. The sensor signal is indicative of the rotational speed of the transmission output member 48. For example, a rate of deceleration is indicated by the rate of change in the magnitude of the sensor signal. Moreover, the controller 70 also monitors vehicle speed in block 111. The sensor signal from sensor 84 is also indicative of the vehicle speed, as the rotational speed of the transmission output member 48 is proportional to the wheel 55 speed, and associated vehicle speed. Additionally, in block 112, the controller 70 monitors the gear ratio of the transmission 44 (i.e., determines which gear ratio the transmission 44 is currently operating in).

Next, in block 113, the controller 70 monitors various motor/generator operating conditions such as a state-of-charge of the battery module 32, a temperature of the battery module 32, and whether any fault signals of the motor/generator 30 are active. These conditions may be monitored based on sensor signals received from suitably positioned sensors.

In block 114, the controller then calculates a percentage braking torque, wherein:

$$\text{Percentage braking torque} = (|\text{braking torque}|/(|\text{engine torque}|+|\text{braking torque}|))*100.$$

If the percentage braking torque is high, then the predominant torque component of the net axle torque is due to the vehicle braking system 64. Alternately, if the percentage braking torque is low, the predominant torque component of the net axle torque is from engine torque. If the percentage braking torque is greater than a predetermined percentage braking torque, loss of engine creep torque will have a relatively small effect on deceleration rate so as not to be noticeable to the vehicle operator, and the method 74 proceeds to block 116. If the percentage braking torque is less than the predetermined percentage braking torque, then engine torque is the primary net axle torque component and the vehicle operating conditions are not appropriate for an engine auto-stop at non-zero vehicle speed. In this case, the method 74 proceeds to block 124 to reset the non-zero vehicle speed engine auto-stop enable signal to "false" (i.e., disable or 0) if set to "true" (i.e., enable, or 1), and to reset a timer 78 if the timer 78 is active (i.e., running. In block 124, if a signal enabling auto-stop is set to "true", or "on", or "1", it is reset to "false" or "off" or "0". For example, in block 119, explained hereinafter, the enable auto-stop signal may have been set to "true". The auto-stop enable signal is shown schematically as EOE in FIG. 7, having either a value of "1" (i.e., true, on, enable), or "0" (i.e., false, off, or not enabled). Additionally, in block 124, if the timer 78 is active (i.e., has previously been started in block 136, explained hereinafter, then the timer 78 is stopped. The method 74 then proceeds to start 101 and continues again to block 102.

In block 116, the controller 70 determines whether the vehicle deceleration rate monitored in block 110 is greater than a predetermined threshold deceleration rate (TVD, shown in FIG. 4), which may be a function of the vehicle speed. The threshold deceleration rate is selected to be of a magnitude sufficient to indicate a high likelihood of an imminent complete vehicle stop intended by the driver, so that a driver change-of-mind during the period between commanding early engine off (i.e., commanding non-zero vehicle speed auto-stop in block 140) and achieving zero vehicle speed is unlikely. If the vehicle deceleration rate is greater than the predetermined threshold deceleration rate, then the method 74 proceeds to block 118. If the vehicle deceleration rate is not greater than the threshold deceleration rate, then the method 74 returns to block 124 to reset the enable signal to "false" if set to "true", and to stop the timer 78 if the timer 78 is active, and a non-zero vehicle speed engine auto-stop is not enabled.

In block 118, the controller 70 determines whether the vehicle speed monitored in block 111 is greater than or equal to a predetermined vehicle speed auto-stop enable threshold, because the requirements of blocks 114 and 116 must be met before the vehicle speed falls below the predetermined vehicle speed auto-stop enable threshold. In one non-limiting example, the vehicle speed auto-stop enable threshold may be 10 kilometers per second. The vehicle speed auto-stop enable threshold is selected to be of a magnitude low enough so that it indicates a high likelihood of a driver's intent to come to an imminent complete stop considering the rate of vehicle deceleration at the selected vehicle speed auto-stop enable threshold.

If the vehicle speed is greater than or equal to the predetermined vehicle speed auto-stop enable threshold, then the method 74 proceeds to block 119 to assert an indicator that blocks 114 and 116 were true at the vehicle speed auto-stop enable threshold. These are the required conditions for enabling auto-stop. In other words, in block 119, a non-zero vehicle speed auto-stop enable signal is set to "true". The method 74 then returns to the start 101. Conversely, if the vehicle speed is less than the predetermined vehicle speed auto-stop enable threshold in block 118, the method 74 proceeds to block 120. Block 120 checks to see if the non-zero vehicle speed auto-stop enable signal is asserted as "true". If the non-zero vehicle speed auto-stop enable signal is not set to "true", the method 74 proceeds to block 124 to reset (i.e., stop) the timer 78 if set to "true".

If the block 120 enable check is satisfied (i.e., the predetermined vehicle speed auto-stop enable threshold had previously been satisfied and the non-zero vehicle speed auto-stop enable signal previously set to "true"), then the requirements of blocks 114 and 116 were met prior to the vehicle speed falling below the predetermined vehicle speed auto-stop enable threshold, and the current vehicle speed is below the predetermined vehicle speed auto-stop enable threshold. Both blocks 114 and 116 must be satisfied when block 118 is satisfied, i.e., when the vehicle speed is greater than or equal to the predetermined vehicle speed auto-stop enable threshold, in order for an engine auto-stop at non-zero vehicle speed to be enabled.

If it is determined in block 120 that the non-zero vehicle speed auto-stop enable signal is "true", then the method 74 proceeds to block 128 to determine whether the current gear ratio is a predetermined gear ratio considered appropriate for a non-zero vehicle speed auto-stop. If the current gear ratio is one of the one-or more predetermined gear ratios, then the method 74 proceeds to block 132. If the current gear ratio is not one of the one or more predetermined gear ratios considered appropriate for a non-zero vehicle speed auto-stop, then the method 74 proceeds to block 124.

In block 132, the controller 70 determines whether predetermined motor/generator capability requirements are met that indicate the motor/generator 30 is capable of performing a non-zero vehicle speed auto-stop. For example, the motor/generator capability requirements may include a requirement that the state-of-charge of the battery module 32 is within a predetermined state-of-charge range. The predetermined state-of-charge range is selected to ensure that the state-of-charge is sufficient to power the motor/generator 30 to restart the engine 14 following an engine auto-stop. The motor/generator capability requirements of block 132 may also include a requirement that the temperature of the battery module 32 is within predetermined battery temperature limits, and a requirement that no motor/generator faults are set as "true". If the motor/generator capability requirements of block 132 are not met, the method 74 returns to block 124.

If the motor/generator requirements of block 132 are met, the method 74 proceeds to block 133. In block 133, a predetermined auto-stop vehicle speed threshold and a predetermined brake pedal position threshold must be satisfied. In other words, vehicle speed must be less than the auto-stop vehicle speed threshold, and the brake pedal position must be greater than (i.e., the brake pedal must be more depressed than) the brake pedal position threshold. The predetermined auto-stop vehicle speed threshold may be based on the deceleration rate of the vehicle (i.e., may vary with deceleration rate), and is below the vehicle speed auto-stop enable threshold referenced in block 118. The brake pedal position threshold may be based on the angular grade the vehicle 10 is on. If the vehicle speed is greater than or equal to the auto-stop vehicle speed threshold or the brake pedal position is not greater than the brake pedal position threshold, then the method 74 proceeds to block 101.

If block 133 is satisfied (i.e., the vehicle speed is less than the auto-stop vehicle speed threshold and the brake pedal position is greater than the brake pedal position threshold), then the method 74 proceeds to block 134 in which the controller 70 determines whether a timer 78 is active (i.e., is already running). If the timer 78 is active, the method 74 proceeds to block 138. If the timer 78 is not active, the method 74 proceeds to block 136 to start the timer 78, and then method 74 proceeds to block 138.

Figure 10:
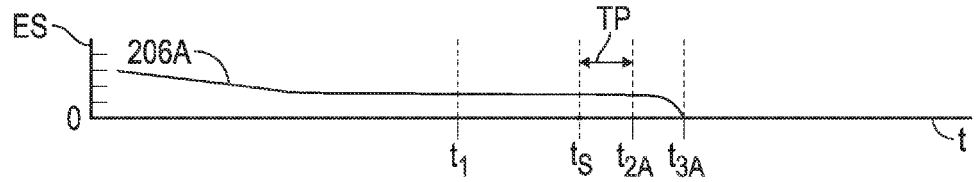
FIG. 10 is a plot of engine crankshaft speed versus time under the second set of vehicle operating conditions.

In block 138, the controller 70 determines whether the timer 78 registers a time greater than a predetermined threshold period of time TP (e.g., shown in FIG. 10). Placing a time requirement on satisfying blocks 114, 116, 133, etc., helps to ensure that a complete vehicle stop is the driver's intent. If the time period TP has not yet passed, the method 74 returns to block 101. If, during the time period TP, the conditions of blocks 114, 116, 132, etc., are no longer satisfied, such as if the brake pedal 62 is lifted after the timer 78 is started, so that the braking torque decreases so that the percentage braking torque is no longer greater than the predetermined percentage braking torque, then an auto-stop enable signal is ceased in block 124, and a non-zero vehicle speed engine auto-stop is not commanded.

If block 138 is satisfied, the method 74 proceeds to block 140, and the controller 70 sends one or more control signals to the motor/generator 30, to the battery module 32, and to the engine 14, to cause the rotational speed of the engine crankshaft 16 be brought to zero. The engine fuel is cut if not already cut due to depression of the brake pedal. For example, the motor/generator 30 is operated as a generator and at a speed to slow the crankshaft 16 to zero. The controller 70 may command that the crankshaft 16 be stopped at a specific crankshaft angle, and may actively control the rate and position at which the crankshaft 16 comes to rest by controlling the speed and torque of the motor/generator 30. Following block 140 the method 74 ends at block 142 and the processor 72 may proceed to execute a separate stored engine auto-start algorithm to determine when to restart the engine 14. Although the method 74 is shown in FIGS. 2A-2B with the steps in a particular order, at least some of the steps may be performed in a different order within the scope of the claims.

Figure 3:
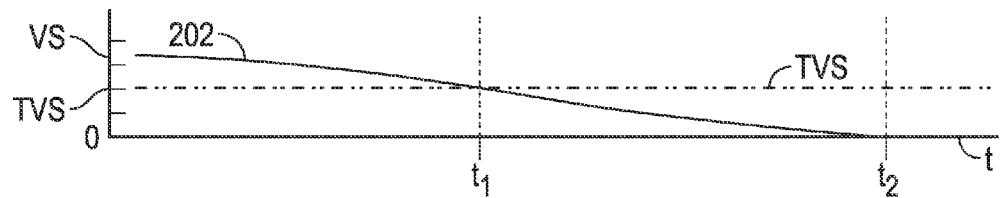
FIG. 3 is a plot of vehicle speed versus time under a first set of vehicle operating conditions in accordance with the present teachings.

FIGS. 3-7 illustrate the method 74 under a first set of vehicle operating conditions where not all requirements are met to enable a non-zero vehicle speed engine auto-stop. Instead, the auto-stop is allowed; but only after zero vehicle speed has been achieved. FIG. 3 is a plot of vehicle speed VS on the vertical axis versus time t on the horizontal axis. The vehicle speed auto-stop enable threshold (TVS) of block 118 of FIG. 2 is indicated, and may be about 10 kilometers per hour, but is not limited to such. The vehicle speed 202 is at the vehicle speed auto-stop enable threshold TVS at time $t_1$, after which it becomes a non-zero vehicle speed that is less than TVS.

Figure 4:
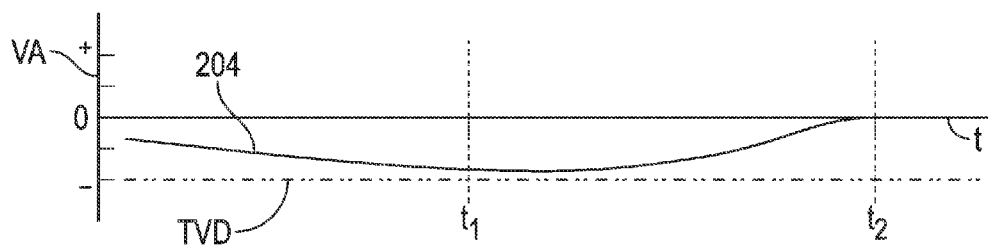
FIG. 4 is a plot of vehicle acceleration versus time under the first set of vehicle operating conditions.

FIG. 4 is a plot of vehicle acceleration rate VA on the vertical axis versus time t on the horizontal axis corresponding with the vehicle speed 202 of FIG. 3. The predetermined threshold deceleration rate (TVD) of block 116 of FIG. 2A is indicated as a negative value on the acceleration plot. The magnitude of the vehicle deceleration rate 204 of vehicle 10 is not greater than (i.e., is not more negative than) the TVD before or at time $t_1$ when the vehicle speed auto-stop enable threshold requirement is met. Accordingly, the method 74 would proceed to block 124 and then return to start 101 from block 116, and the non-zero vehicle speed auto-stop is not enabled.

Figure 5:
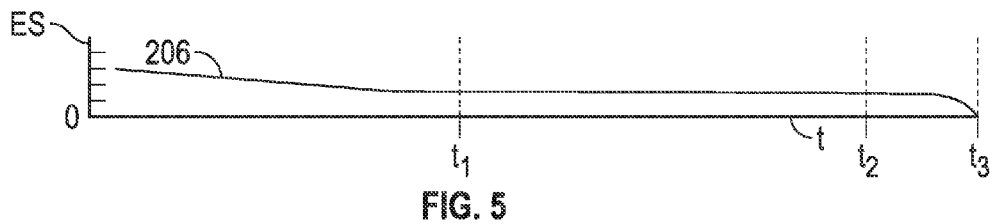
FIG. 5 is a plot of engine crankshaft speed versus time under the first set of vehicle operating conditions.

FIG. 5 is a plot of engine speed ES on the vertical axis versus time t on the horizontal axis under the first set of vehicle operating conditions. Because the vehicle deceleration rate requirement of block 116 is not met, the rotational speed of the crankshaft 16 (i.e., engine speed 206) of the vehicle 10 is not commanded to zero until the vehicle speed 202 of FIG. 3 reaches 0 kilometers per hour at time $t_2$. That is, the engine auto-stop at time $t_2$ is a zero vehicle speed auto-stop, and not a non-zero vehicle speed engine auto-stop commanded under block 140. Once the engine speed is commanded to zero, the crankshaft 16 is slowed by the motor/generator 30 of FIG. 1 at a controlled rate to reach zero rotational crankshaft speed and a desired crankshaft angle at time $t_3$.

Figure 6:
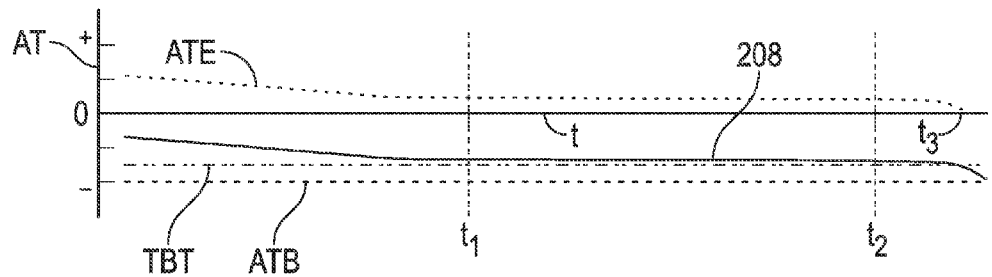
FIG. 6 is a plot of positive engine torque, negative braking torque, and net axle torque all versus time under the first set of vehicle operating conditions.
Figure 7:
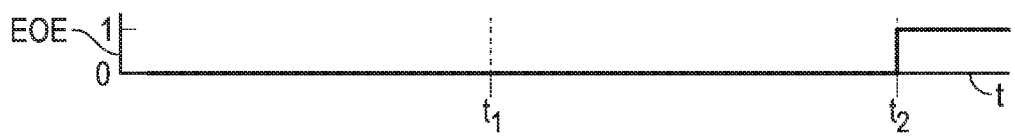
FIG. 7 is a plot of an enable signal for a non-zero vehicle speed engine auto-stop versus time under the first set of vehicle operating conditions.

FIG. 6 is a plot of axle torque AT on the drive axle 52 of FIG. 1 in Newton-meters on the vertical axis versus time t in seconds on the horizontal axis. The net axle torque is indicated as curve 208 and is the sum of the positive engine axle torque contribution ATE and the negative braking torque contribution ATB. A threshold braking torque TBT is indicated. The threshold braking torque TBT is correlated with the percentage braking torque of block 114. The net axle torque 208 is not more negative than the threshold braking torque TBT at time $t_1$, after which the vehicle speed passes below the vehicle speed auto-stop enable threshold TVS. Accordingly, the percentage braking torque requirement of block 114 of the method 74 of FIG. 2 is not satisfied. For this reason as well, the controller 70 does not execute a non-zero vehicle speed auto-stop via block 140. FIG. 7 indicates the on-off (i.e., true-false) status of an auto-stop enable signal (engine off enable) EOE of blocks 119 and 124, with level 1 indicating the enable is set to "true" (i.e., the conditions permit a command to set the crankshaft rotational speed to zero), and level 0 indicating the enable is set to false (i.e., the conditions do not permit such a command to set the crankshaft rotational speed to zero). Engine auto-stop is not enabled, and the command for zero crankshaft rotational speed is not given by the controller 70 until time $t_2$ when the vehicle speed VS is zero. The method 74 thus does not permit a command of zero crankshaft rotational speed at a non-zero vehicle speed under the first set of vehicle operating conditions.

Figure 8:
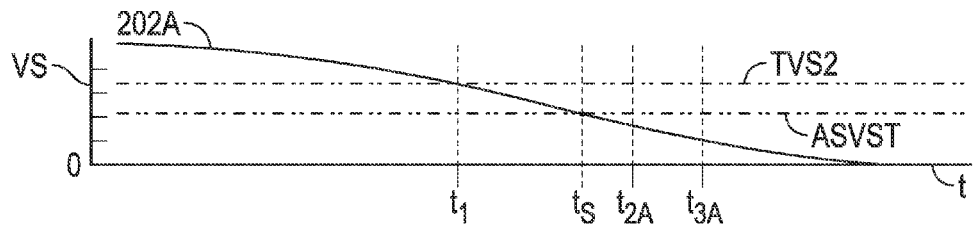
FIG. 8 is a plot of vehicle speed versus time under a second set of vehicle operating conditions in accordance with an alternative aspect of the present teachings.

FIGS. 8-12 illustrate the method 74 under a second set of vehicle operating conditions for which the method 74 permits zero crankshaft rotational speed at a non-zero vehicle speed. FIG. 8 illustrates that the vehicle speed auto-stop enable threshold varies as a function of vehicle deceleration rate under the method 74. FIG. 8 shows a slightly higher vehicle speed auto-stop enable threshold TVS2 than the vehicle speed auto-stop enable threshold TVS of FIG. 3, set higher due to the greater (more negative) vehicle deceleration rate 204A of the vehicle 10 indicated in FIG. 9, as monitored from time $t_0$ and prior to time $t_1$. The vehicle speed 202A passes below the vehicle speed auto-stop enable threshold TVS2 after time $t_1$ and is a non-zero vehicle speed that is greater than the vehicle speed auto-stop enable threshold TVS2 just prior to time $t_1$. The vehicle deceleration rate requirement of block 116 of the method 74 is met just prior to and at time $t_1$ as the vehicle deceleration rate 204A is more negative than the threshold vehicle deceleration rate TVD at time $t_1$.

Figure 11:
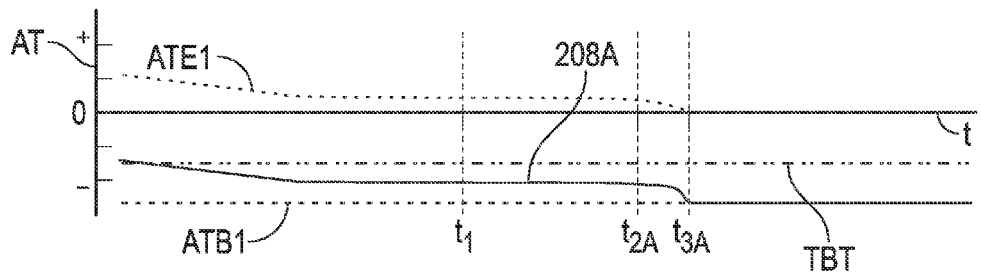
FIG. 11 is a plot of positive engine torque, negative braking torque, and net axle torque all versus time under the second set of vehicle operating conditions.
Figure 12:
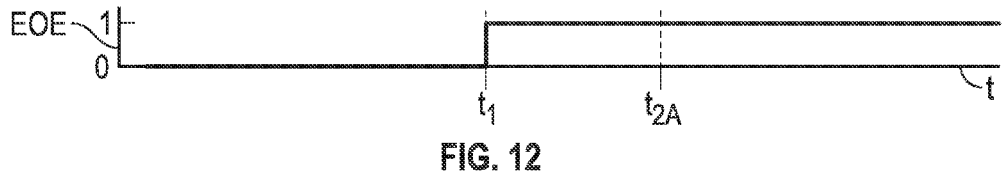
FIG. 12 is a plot of an enable signal for a non-zero vehicle speed engine auto-stop versus time under the second set of vehicle operating conditions.

FIG. 11 shows the net axle torque as curve 208A and is the sum of the positive engine axle torque contribution ATE1 and the negative braking torque contribution ATB1. The threshold braking torque TBT is indicated. The net axle torque 208A is more negative than the threshold braking torque TBT at and just before time $t_1$ when the vehicle speed auto-stop enable threshold TVS2 requirement is met. Accordingly, the predetermined percentage braking torque requirement of block 114 of the method 74 of FIG. 2 is also satisfied. The auto-stop enable signal EOE of FIG. 12 indicates at time $t_1$ that the conditions of block 118 are met and the non-zero vehicle speed auto-stop enable signal is "true" per block 119. If the gear ratio requirement of block 128, the motor/generator capability requirements of block 132, and the auto-stop vehicle speed threshold ASVST and brake pedal position threshold requirements of block 133 are met, the timer 78 is started at time $t_s$ in step 136 (if not already active) and is run for a predetermined period of time TP, which is the time period from time $t_s$ to time $t_{2A}$ indicated in FIG. 10).

The percentage braking torque requirement of block 114 and the vehicle deceleration rate requirement of block 116 are continuously satisfied during the time period from $t_s$ to $t_{2A}$ and the vehicle speed remains below auto-stop enable threshold (TVS). Assuming that the gear ratio requirement of block 128, the motor/generator capability requirements of block 132 and the auto-stop vehicle speed threshold and brake pedal position threshold requirements (not shown in FIGS. 8-11) of block 133 are continually met during the time period TP, then, under block 140, the controller 70 commands a non-zero vehicle speed auto-stop at time $t_{2A}$, as indicated by the change in the engine speed curve 206A, and the axle torque engine contribution ATE1 between times $t_{2A}$ and $t_{3A}$. The controller 70 thereby controls the motor/generator 30 of FIG. 1 to function as a generator to slow the engine crankshaft 16 to zero speed, implementing a non-zero vehicle speed engine auto-stop as is apparent from curve 206A in FIG. 10. The rotational speed of the engine crankshaft 16 shown as curve 206A in FIG. 10 reaches zero, and is positioned at a desired crank angle at time $t_{3A}$, when the vehicle speed 202A is still non-zero, as indicated in FIG. 8. The effect of the loss of engine creep torque at time $t_{3A}$ on the net axle torque 208A is apparent in FIG. 11. However, the threshold braking torque TBT and the threshold vehicle deceleration rate TVD are selected to be of a magnitude sufficient to minimize the noticeability to the driver of the change in net axle torque.

FIGS. 13-17 illustrate the method 74 under a third set of vehicle operating conditions which initially satisfy the conditions of the method 74 that would permit a zero crankshaft rotational speed at a non-zero vehicle speed, but do not satisfy the requirements for the entire time period TP due to the vehicle operator releasing the brake pedal 62, thereby preventing commanding of an engine auto-stop at a non-zero vehicle speed.

Figure 9:
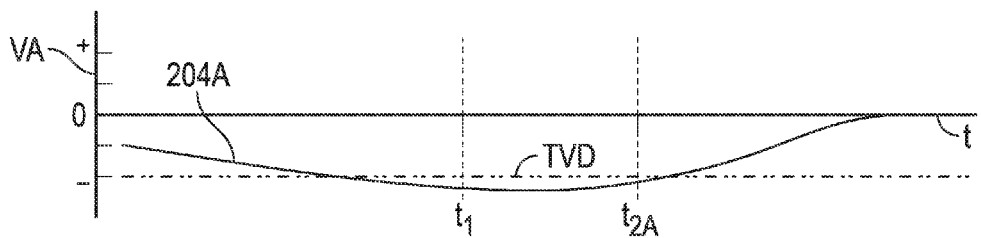
FIG. 9 is a plot of vehicle acceleration versus time under the second set of vehicle operating conditions.
Figure 13:
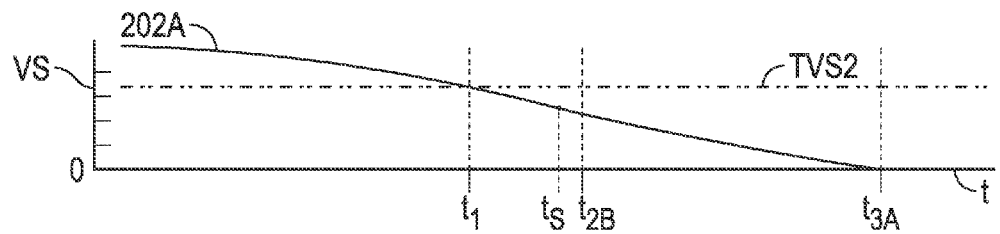
FIG. 13 is a plot of vehicle speed versus time under a third set of vehicle operating conditions in accordance with an alternative aspect of the present teachings.
Figure 14:
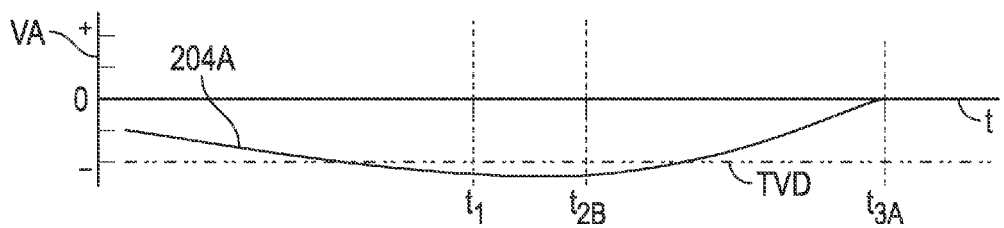
FIG. 14 is a plot of vehicle acceleration versus time under the third set of vehicle operating conditions.
Figure 15:
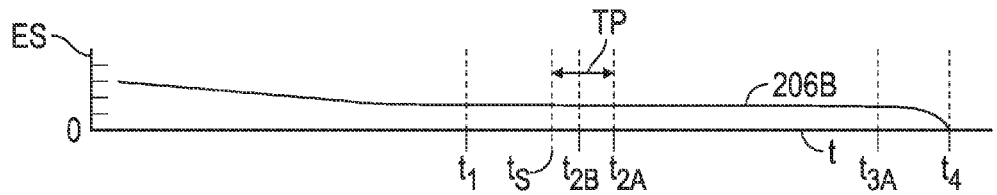
FIG. 15 is a plot of engine crankshaft speed versus time under the third set of vehicle operating conditions.
Figure 16:
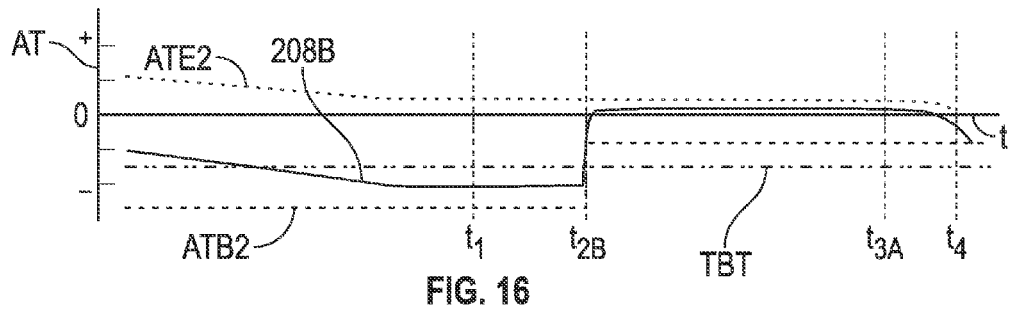
FIG. 16 is a plot of positive engine torque, negative braking torque, and net axle torque all versus time under the third set of vehicle operating conditions.
Figure 17:
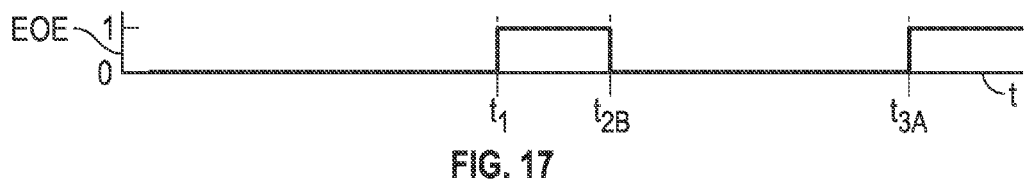
FIG. 17 is a plot of an enable signal for a non-zero vehicle speed engine auto-stop versus time under the third set of vehicle operating conditions.
Figure 18:
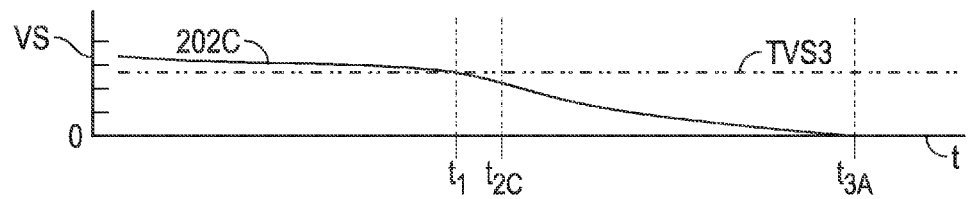
FIG. 18 is a plot of vehicle speed versus time under a fourth set of vehicle operating conditions in accordance with an alternative aspect of the present teachings.

The vehicle speed 202A of FIG. 13 and the vehicle deceleration rate 204A of FIG. 14 are the same as described with respect to FIGS. 8 and 9. The vehicle speed auto-stop enable threshold TVS2 is met at time $t_1$. The vehicle deceleration rate 204A is greater than (more negative than) the threshold vehicle deceleration rate TVD just before and at time $t_1$, and the net vehicle axle torque 208B of FIG. 16 is more negative than the threshold braking torque TBT just before and at time $t_1$. The corresponding percentage braking torque requirement of block 114 is thus met, and the requirements of blocks 116, and 118 of the method 74 of FIG. 2 are thus satisfied. The auto-stop enable signal EOE is set to (1), i.e., enable, in block 119. Assuming that the requirements of blocks 128, 132, and 133 are met at time $t_s$, the timer 78 is started at time $t_s$ according to block 136. However, at time $t_{2B}$, prior to the end of the time period TP at time $t_{2A}$, the net axle torque 208B is no longer more negative than the threshold braking torque TBT, as the negative braking torque contribution ATB2 sharply decreases in magnitude (i.e., becomes less negative) when the vehicle operator partially lifts the brake pedal 62 of FIG. 1. Because block 114 of the method 74 of FIG. 2 is thus no longer satisfied, the auto-stop enable signal EOE is set to (0), i.e., disable, at time $t_{2B}$ and the method 74 does not proceed to block 140. The vehicle speed 202A reaches zero at time $t_{3A}$. Accordingly, the auto-stop enable signal EOE is again set to enable at time $t_{3A}$, and the controller 70 commands zero rotational speed of the crankshaft 16, controlling the engine crankshaft 16 to zero rotational speed with a zero vehicle speed, but not when at a non-zero vehicle speed. That is, the engine auto-stop is a zero vehicle speed auto-stop, and not a non-zero vehicle speed engine auto-stop commanded under block 140. Zero crankshaft rotational speed is thus not achieved until time $t_4$, significantly later than under the second set of vehicle operating conditions.

FIGS. 18-22 illustrate the method 74 under a fourth set of vehicle operating conditions in which engine off is not enabled at a non-zero vehicle speed because the requirement of block 116 for such are not met before and at the time that the vehicle speed threshold requirement of block 118 is met, even though the requirement is later satisfied. Specifically, the vehicle speed 202C satisfies the conditions of block 118 of the algorithm 74 at time $t_1$ when it is equal to the vehicle speed auto-stop enable threshold TVS3. The vehicle speed auto-stop enable threshold TVS3 is slightly less than the vehicle speed auto-stop enable threshold TVS2 of FIG. 13 because the magnitude of the vehicle speed auto-stop enable threshold is a function of vehicle deceleration rate under the method 74. The vehicle deceleration rate 204C indicates that the magnitude of the deceleration rate is not as great during the time from 0 to $t_1$ under the fourth set of operating conditions than under the third set of vehicle operating conditions.

Figure 19:
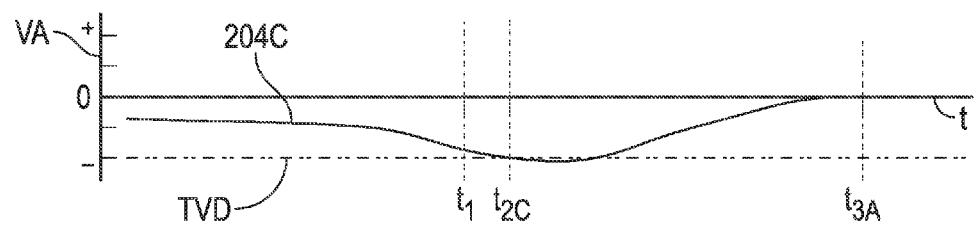
FIG. 19 is a plot of vehicle acceleration versus time under the fourth set of vehicle operating conditions.
Figure 20:
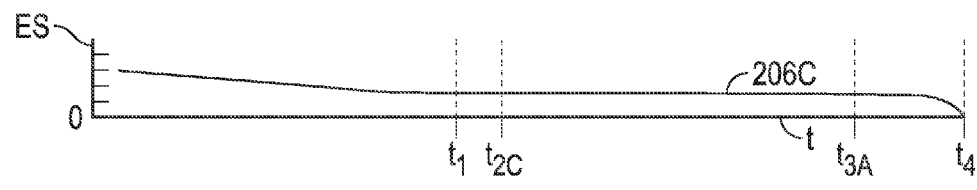
FIG. 20 is a plot of engine crankshaft speed versus time under the fourth set of vehicle operating conditions.
Figure 21:
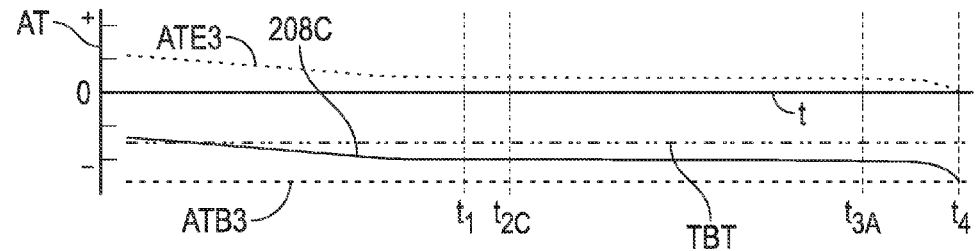
FIG. 21 is a plot of positive engine torque, negative braking torque, and net axle torque all versus time under the fourth set of vehicle operating conditions.
Figure 22:
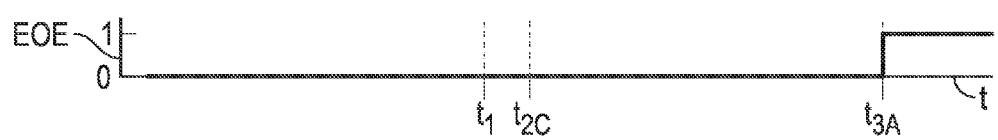
FIG. 22 is a plot of an enable signal for a non-zero vehicle speed engine auto-stop versus time under the fourth set of vehicle operating conditions.

The net axle torque 208C shown in FIG. 21 satisfies block 114 before and at time $t_1$, as the sum of the positive engine axle torque contribution ATE3 and the negative braking torque contribution ATB3 results in a relatively large negative net axle torque at time $t_1$. Accordingly, the corresponding percentage braking torque requirement of block 114 is met. However, at time $t_1$, the vehicle deceleration rate requirement of block 116 of the method 74 is not met at time $t_1$ as the vehicle deceleration rate 204C of FIG. 19 is not more negative than the threshold vehicle deceleration rate TVD. Although the vehicle deceleration rate 204C subsequently becomes more negative than the threshold vehicle deceleration rate TVD at time $t_{2C}$, this does not correct for the failure to satisfy the requirement of block 116 prior to and at time $t_1$. Accordingly, the auto-stop enable signal EOE is not set to enable until time $t_{3A}$ when the vehicle speed 202C becomes zero. That is, the engine auto-stop is a zero vehicle speed auto-stop, and not a non-zero vehicle speed engine auto-stop commanded under block 140. Accordingly, at time $t_{3A}$, at the zero vehicle speed, the controller 70 commands the motor/generator 30 to control the rotational speed of the crankshaft 16 to zero, which is achieved at time t4.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A method of controlling a vehicle with a hybrid powertrain having an engine with a rotatable crankshaft, a drive axle operatively connected to and driven by the crankshaft, and an electric motor/generator operatively connected to the crankshaft, the method comprising:
    monitoring, via an electronic controller, engine torque in a first direction of rotation and braking torque in an opposite second direction of rotation;
    monitoring, via the electronic controller, vehicle deceleration rate;
    monitoring, via the electronic controller, vehicle speed;
    controlling, via the electronic controller, the motor/generator to stop rotation of the crankshaft when the vehicle speed is non-zero if a percentage braking torque is greater than a predetermined percentage braking torque and the vehicle deceleration rate is greater than a predetermined threshold vehicle deceleration rate; and
    wherein the percentage braking torque is based on the monitored braking torque and the engine torque.

2. The method of claim 1, wherein said controlling, via the electronic controller, the motor/generator to stop rotation of the crankshaft occurs only if the vehicle speed is less than a predetermined auto-stop vehicle speed threshold; and wherein the predetermined auto-stop vehicle speed threshold varies as a function of the vehicle deceleration rate.

3. The method of claim 1, wherein said monitoring, via the electronic controller, braking torque includes monitoring a brake pedal position; and
    wherein said controlling, via the electronic controller, the motor/generator to stop rotation of the crankshaft occurs only if the brake pedal position is greater than a predetermined brake pedal position threshold.

4. The method of claim 3, wherein the predetermined brake pedal position threshold varies as a function of vehicle grade.

5. The method of claim 1, wherein said controlling, via the electronic controller, the motor/generator to stop rotation of the crankshaft occurs only if the percentage braking torque is greater than the predetermined percentage braking torque and the deceleration rate is greater than the threshold vehicle deceleration rate when the vehicle speed is greater than or equal to a vehicle speed auto-stop enable threshold.

6. The method of claim 1, further comprising:
starting a timer, via the electronic controller, only if the vehicle speed is less than a predetermined auto-stop vehicle speed threshold and a brake pedal position is greater than a predetermined brake pedal position threshold; and
wherein said controlling the motor/generator, via the electronic controller, to stop rotation of the crankshaft occurs only if the vehicle speed is less than the predetermined auto-stop vehicle speed threshold and the brake pedal position is greater than the predetermined brake pedal position threshold for a predetermined period of time following said starting the timer.

7. The method of claim 6, further comprising:
stopping the timer, via the electronic controller, if either the vehicle speed is not less than the predetermined auto-stop vehicle speed threshold or the brake pedal position is not greater than the predetermined brake pedal position threshold for the predetermined period of time following said starting the timer.

8. The method of claim 1, further comprising:
monitoring, via the electronic controller, operating conditions of the motor/generator;
determining, via the electronic controller, whether the operating conditions of the motor/generator meet predetermined motor/generator capability requirements for non-zero vehicle speed engine auto-stop; and
wherein said controlling, via the electronic controller, the motor/generator to stop rotation of the crankshaft occurs only if the operating conditions of the motor/generator meet the predetermined motor/generator capability requirements.

9. The method of claim 1, wherein the hybrid powertrain includes a multi-speed transmission having an input member operatively connectable with the engine and having an output member; wherein the multi-speed transmission is operable to establish multiple different gear ratios of torque of the output member to torque of the input member, and further comprising:
monitoring, via the electronic controller, a gear ratio of the transmission; and
wherein said controlling, via the electronic controller, the motor/generator to stop rotation of the crankshaft occurs only if the gear ratio of the transmission is a predetermined one of said multiple different gear ratios.

10. A method of controlling a vehicle with a hybrid powertrain having an engine with a rotatable crankshaft, a drive axle operatively connected to and driven by the crankshaft, and an electric motor/generator operatively connected to the crankshaft, the method comprising:
monitoring, via an electronic controller, engine torque and braking torque on the drive axle;
monitoring, via the electronic controller, vehicle deceleration rate;
monitoring, via the electronic controller, vehicle speed;
starting a timer, via the electronic controller, only if:
a percentage braking torque is greater than a predetermined percentage braking torque when the vehicle speed is greater than or equal to a predetermined vehicle speed auto-stop enable threshold;
the vehicle deceleration rate is greater than a predetermined threshold vehicle deceleration rate when the vehicle speed is greater than or equal to the predetermined vehicle speed auto-stop enable threshold;
a brake pedal position is greater than a predetermined brake pedal position threshold; and
the vehicle speed is less than a predetermined auto-stop vehicle speed threshold;
controlling, via the electronic controller, the motor/generator to stop rotation of the crankshaft only if, for a predetermined period of time following said starting the timer:
the percentage braking torque remains greater than the predetermined percentage braking torque;
the vehicle deceleration rate remains greater than the predetermined threshold vehicle deceleration rate;
the brake pedal position remains greater than the predetermined brake pedal position threshold; and
the vehicle speed remains less than a predetermined auto-stop vehicle speed threshold.

11. The method of claim 10, wherein the predetermined auto-stop vehicle speed threshold varies as a function of the vehicle deceleration rate.

12. The method of claim 10, wherein the predetermined brake pedal position threshold varies as a function of vehicle grade.

13. The method of claim 10, further comprising:
monitoring, via the electronic controller, operating conditions of the motor/generator;
determining whether the operating conditions of the motor/generator meet predetermined motor/generator capability requirements for non-zero vehicle speed engine auto-stop;
wherein said starting the timer occurs only if the operating conditions of the motor/generator meet the predetermined motor/generator capability requirements; and
wherein said controlling the motor/generator to stop rotation of the crankshaft occurs only if the operating conditions of the motor/generator meet the predetermined motor/generator capability requirements for the predetermined period of time following said starting the timer.

14. The method of claim 10, wherein the hybrid powertrain includes a multi-speed transmission having an input member operatively connectable with the engine and having an output member; wherein the multi-speed transmission is operable to establish multiple different gear ratios of torque of the output member to torque of the input member, and further comprising:
monitoring, via the electronic controller, a gear ratio of the transmission; and
wherein said controlling, via the electronic controller, the motor/generator to stop rotation of the crankshaft occurs only if the gear ratio of the transmission is a predetermined one of said multiple different gear ratios.

15. The method of claim 10, wherein the brake pedal position is indexed to brake pressure.

16. A vehicle comprising:
an engine with a rotatable crankshaft;
a drive axle operatively connected to and driven at least partially by the engine;
an electric motor/generator operatively connected to the crankshaft;
an electronic controller in communication with the engine, the drive axle, and the motor/generator and having a processor configured to execute a stored algorithm to thereby:
monitor net axle torque on the drive axle; wherein the net axle torque is the sum of engine torque in a first direction of rotation and braking torque in an opposite second direction of rotation;
monitor vehicle deceleration rate;
monitor vehicle speed; and control the motor/generator to stop rotation of the crankshaft when the vehicle speed is non-zero if a percentage braking torque is greater than a predetermined percentage braking torque and the vehicle deceleration rate is greater than a predetermined threshold vehicle deceleration rate; and wherein the predetermined percentage braking torque is based on the braking torque and the engine torque.

17. The vehicle of claim 16, wherein the electronic controller controls the motor/generator to stop rotation of the crankshaft only if:
the percentage braking torque is greater than the predetermined percentage braking torque and the deceleration rate is greater than the threshold vehicle deceleration rate when the vehicle speed is greater than or equal to a vehicle speed auto-stop enable threshold;
the vehicle speed is less than a predetermined auto-stop vehicle speed threshold; and
the brake pedal position is greater than a predetermined brake pedal position threshold.

18. The vehicle of claim 16, wherein the processor includes a timer;
wherein the controller starts the timer only if:
the percentage braking torque is greater than the predetermined percentage braking torque when the vehicle speed is greater than or equal to the predetermined vehicle speed auto-stop enable threshold;
the vehicle deceleration rate is greater than the predetermined threshold vehicle deceleration rate when the vehicle speed is greater than or equal to the predetermined vehicle speed auto-stop enable threshold;
the brake pedal position is greater than the predetermined brake pedal position threshold; and
the vehicle speed is less than the predetermined auto-stop vehicle speed threshold;

wherein the controller controls the motor/generator to stop rotation of the crankshaft only if, for a predetermined period of time following said starting the timer:
the percentage braking torque remains greater than the predetermined percentage braking torque;
the vehicle deceleration rate remains greater than the predetermined threshold vehicle deceleration rate;
the brake pedal position remains greater than the predetermined brake pedal position threshold; and
the vehicle speed remains less than the predetermined auto-stop vehicle speed threshold.

19. The vehicle of claim 16, wherein, by executing the stored algorithm, the electronic controller further:
monitors operating conditions of the motor/generator;
determines whether the operating conditions of the motor/generator meet predetermined motor/generator capability requirements for non-zero vehicle speed engine auto-stop; and
wherein the electronic controller controls the motor/generator to stop rotation of the crankshaft only if the operating conditions of the motor/generator meet the predetermined motor/generator capability requirements.

20. The vehicle of claim 16, wherein the hybrid powertrain includes a multi-speed transmission having an input member operatively connectable with the engine and having an output member; wherein the multi-speed transmission is operable to establish multiple different gear ratios of torque of the output member to torque of the input member; wherein, by executing the stored algorithm, the electronic controller further:
monitors a gear ratio of the transmission; and
controls the motor/generator to stop rotation of the crankshaft only if the gear ratio of the transmission is a predetermined one of said multiple different gear ratios.

\* \* \* \* \*